Figure 1:
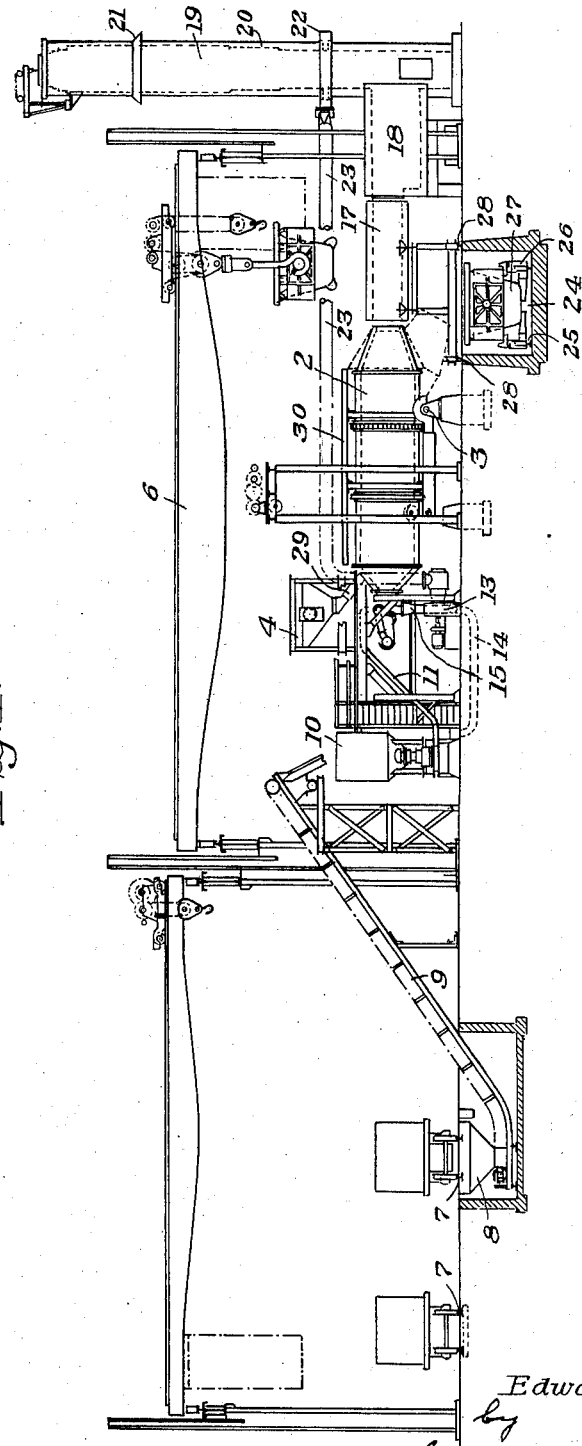

Oct. 14, 1941.　　　　E. B. STORY　　　　2,258,632
MANUFACTURE OF WROUGHT IRON
Filed Aug. 26, 1939　　　　2 Sheets-Sheet 2

INVENTOR
Edward B. Story

Patented Oct. 14, 1941

2,258,632

UNITED STATES PATENT OFFICE 2,258,632

MANUFACTURE OF WROUGHT IRON

Edward B. Story, Bethel Township, Pa., assignor to A. M. Byers Company, Pittsburgh, Pa., a corporation of Pennsylvania Application August 26, 1939, Serial No. 292,095

11 Claims. (Cl. 75—24)

This invention relates to the manufacture of wrought iron by the Aston process in which molten ferrous material is admixed with molten slag to form a wrought iron sponge ball. The invention has to do more particularly with the preparation of molten slag for use in the making of wrought iron by the Aston process and especially with certain improvements in connection with the preparation of such molten slag including the production of a new and improved molten slag, recovery of iron from remelted slag and an improved method of charging a metallurgical batch operation furnace of large capacity such as may be used to advantage in the preparation of such molten slag.

The slag employed in the Aston process is an iron silicate slag which contains FeO and $Fe_2O_3$. It is well known that FeO in the slag tends to make the slag fluid and the slag fibers relatively thin and well distributed and is a very desirable ingredient, whereas $Fe_2O_3$ has the opposite effect and tends to make the slag sluggish and is undesirable. Consequently efforts have for years been directed toward keeping the FeO content of the slag as high as possible and the $Fe_2O_3$ content as low as possible. Prior to the present invention the preferred method of preparing molten slag for use in the Aston process of making wrought iron and the method employed commercially at the Ambridge plant of the A. M. Byers Company was to melt the slag or slag making ingredients in an open hearth furnace. Although the melting point of the slag employed is in the neighborhood of 2200° F., temperatures of the order of 2800 to 2900° F. have been found necessary in the open hearth furnace in order to melt the slag or slag making ingredients with desirable efficiency. In an open hearth furnace the charge lies on the furnace hearth and only the surface thereof is directly subjected to the maximum furnace temperature. The result is that throughout a large proportion of the melting time a relatively small portion of the charge at its surface is raised to the melting point whereas the underlying slag is relatively cold, slag being a very poor conductor of heat. During the melting portions of the slag progressively reach melting temperature and a pool of molten slag forms about the portion of the charge which has not been raised to the melting point. Such molten slag is subjected to the oxidizing flame in the open hearth furnace and consequently its percentage of $Fe_2O_3$ is considerably increased. Depending upon conditions, slag thus produced in an open hearth furnace may contain as much as 40% $Fe_2O_3$, which is far too high. If coal is used as a reducing agent in an open hearth furnace the percentage of $Fe_2O_3$ can be brought down somewhat and by tapping off the molten slag periodically during the melt the percentage of $Fe_2O_3$ can be further reduced. However, in commercial operation the lowest percentage of $Fe_2O_3$ that can be regularly obtained when the molten slag is prepared in an open hearth furnace is about 14 or 15%, whereas a substantially lower percentage is highly desirable. It has on occasion been possible to reduce the percentage of $Fe_2O_3$ to between 12 and 13%, but such results cannot be regularly obtained. In a slag of the type in question containing about 10 or 12% $SiO_2$, FeO and $Fe_2O_3$ are in equilibrium at about 10% $Fe_2O_3$ and of course the percentage of $Fe_2O_3$ cannot preferentially be reduced below the point of equilibrium during the melt. If an attempt be made to reduce the $Fe_2O_3$ below about 10%, metallic iron is reduced from the slag while the equilibrium relationship of about 10% $Fe_2O_3$ persists. However, it is desirable that such point be reached or at least very closely approached, and this is impossible with the methods of preparing slag heretofore employed.

As the $SiO_2$ content of the slag increases the FeO is more tightly bound with the $SiO_2$ and therefore less available to be reduced by any one given reducing condition. If, for example, the $SiO_2$ content of the slag should be increased to, say, between 15 and 20%, the equilibrium between FeO and $Fe_2O_3$ would probably stand at somewhat less than 10% $Fe_2O_3$.

I have devised a method of preparing molten slag for use in the Aston process of making wrought iron which will normally produce molten slag having an $Fe_2O_3$ content of less than 12% and lying in the range between 10 and 12%. The slag thus produced constitutes a great improvement over the slag heretofore obtainable and results in the production of wrought iron of superior quality due to the character and distribution of the slag fibers and also results in manufacturing economy by reason of the relative fluidity of the slag.

I have discovered that molten slag of the type employed in the manufacture of wrought iron by the Aston process can be prepared to great advantage in a rotary melting furnace, as by so doing the proportion of $Fe_2O_3$ in the slag can be kept down within the desired limits of 10 to 12% in normal operation. This result has never been obtainable commercially by any method of slag preparation previously employed. In a rotary furnace the charge is being continually agitated and turned over so that no localized portion of it prematurely reaches the melting point. As the charge is gradually heated up in the rotary furnace it becomes progressively more and more plastic and tends to adhere, at least to some extent, to the furnace wall. Due to the action of the rotary furnace each particle of the charge tends to equalize in temperature with its neighbors, with the result that substantially the entire charge is heated to a temperature very close to the melting point before any substantial portion of the charge actually becomes molten. By use of a rotary furnace it is possible to approach very closely the highly desirable theoretical condition that the entire charge is heated almost to the melting point before any of it actually becomes molten and then upon a further slight increase in temperature the entire charge melts very quickly. I believe that this action is primarily responsible for the low percentage of $Fe_2O_3$ in slag prepared in a rotary furnace, as slag does not oxidize appreciably in the non-molten state and there is very little oxidation prior to the slag reaching the melting point. But as substantially the entire charge reaches the melting point at one time it is possible by the use of a rotary furnace to reduce to a minimum the time during which the slag while in molten condition is subjected to a high temperature and as soon as the slag melts it may immediately be removed from the furnace.

The molten slag thus prepared is then admixed with molten ferrous material to make wrought iron by the well known Aston process. In one preferred manner of carrying out such process, and as disclosed in a number of earlier patents of A. M. Byers Company, molten ferrous metal is poured into a bath of molten slag, the metal being granulated in the slag bath and the solidified or partly solidified granules of ferrous material being individually coated with slag and welded together to form at the bottom of the slag receptacle a compressible mass or "ball" of wrought iron. The ball thus formed is separated from the excess slag in the slag receptacle, preferably by decanting off the excess slag, and the ball is then squeezed in a press to remove a portion of the contained slag and to form a bloom. The bloom is then rolled in a blooming mill wherein during reduction further slag is squeezed out and wrought iron billets are formed.

Solidified slag is recovered from the slag receptacles, the press and the blooming mill and such recovered slag is remelted and reused. The supply of solidified slag available to A. M. Byers Company is sufficient that normally the charge which in introduced into the furnace where the molten slag is prepared is entirely or almost entirely solidified slag which has previously been employed in the Aston process and which is remelted for reuse. In special cases, in place of or in addition to the solidified slag, slag making ingredients may be charged into the furnace in which the molten slag is prepared. However, at least some solidified slag is practically always used and normally, as above stated, either the entire charge or the greater portion of it is solidified previously used slag. Such solidified slag as charged to the rotary furnace is normally a typical solidified iron silicate slag as recovered from the Aston process and which as recovered ordinarily contains about 12 to 14% $Fe_2O_3$. This solidified recovered slag is, of course, the same slag as previously melted for processing and which as melted may have an $Fe_2O_3$ content as low as between 10 and 11%, the $Fe_2O_3$ content increasing between the time of melting the slag and the time of solidification thereof prior to recovery.

When a rotary furnace is used for the preparation of molten slag for use in the Aston process, and when, as is normally the case, at least the greater portion of the charge is made up of solidified previously used slag, I find that such charge contains substantial quantities of iron picked up no doubt in the previous admixing or processing operation. The slag recovered from the press is especially rich in iron and there is also some iron in the slag recovered from the blooming mill and small quantities of iron in the slag recovered as scull from the slag receptacles. I find that the iron, which apparently exists in the slag as metallic inclusions, separates out and tends to agglomerate in the rotary furnace. The furnace temperature is preferably not over about 2400 to 2500° F., which is intermediate the melting point of the slag and the melting point of iron, so that as the slag melts the iron reaches a welding temperature but does not melt, and the iron particles agglomerate or weld together in a more or less homogeneous elongated mass which stays in the bottom of the rotary furnace and turns over and over during operation of the furnace so that when the slag has been melted the iron is substantially completely separated from the slag and lies in the bottom of the furnace in non-molten condition in a rounded elongated mass of generally sausage shape. The mass of iron thus recovered can be removed from the furnace and reused. Such recovery of iron has not been possible when preparing molten slag in an open hearth furnace, as the temperature which has been employed in the open hearth slag melting furnace has been higher than the melting point of iron and the iron has reacted to form oxides, principally $Fe_2O_3$, which is undesirable for reasons explained above.

The capacity of the rotary furnace which I prefer to use in the preparation of molten slag is about 24 or 25 tons and on occasion, and particularly when the furnace charge is mainly or entirely slag which has been recovered from the press, a mass of iron weighing several hundred pounds has been recovered from a single charge. The rotary furnace operates as a batch furnace, being charged with solidified slag or slag making ingredients and the charge being melted and then tapped from the furnace and a new cold charge introduced. The recovered iron may conveniently be removed from the furnace after the molten slag has been poured out. A standard type of rotary furnace may be employed and I prefer to utilize a furnace which rotates about a horizontal axis and which is tiltable to pour out the molten slag.

I also provide improved means for and an improved method of charging the rotary furnace. I provide a charging receptacle of sufficient capacity to hold an entire furnace charge. Such receptacle is portable and is preferably handled by an overhead crane. It is positioned at a point convenient to the source of supply of the materials to be charged where a quantity of such materials forming a full furnace charge is introduced into the charging receptacle. The charging receptacle is then moved to a position adjacent the furnace and elevated with respect thereto so that its contents may be dumped into the furnace. This charging method is highly efficient and economical. It is desirable to immediately recharge the rotary furnace as soon as it has been tapped and the recovered iron, if any, removed and before the furnace loses its heat. Consequently I find it desirable to fill the charging receptacle while the furnace is in operation and position the charging receptacle in charging position before tapping the furnace. I then tap the furnace and immediately after tapping I dump the contents of the charging receptacle into the furnace and immediately begin to melt such charge. I thus save valuable minutes and very appreciable quantities of heat which would otherwise be dissipated.

Other details, objects and advantages of the invention will become apparent as the following description of a present preferred embodiment thereof and a present preferred method of practicing the same proceeds.

Figure 2:
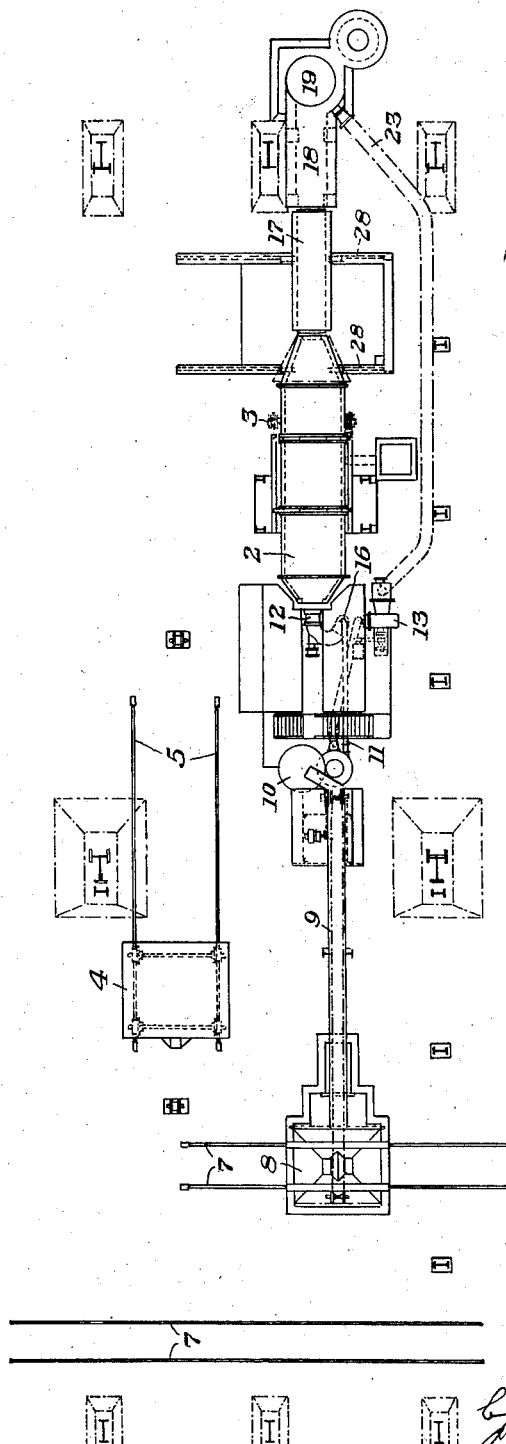

In the accompanying drawings I have shown a present preferred embodiment of the invention and have illustrated a present preferred method of practicing the same, in which Figure 1 is a diagrammatic elevational view of a rotary slag melting furnace and associated equipment, and Figure 2 is a plan view of the furnace and equipment shown in Figure 1.

Referring now more particularly to the drawings, the rotary slag melting furnace is shown at 2 and may, as above stated, be of standard type. It rotates about a horizontal axis and has frusto-conical ends both of which are open. The left-hand end viewing the drawings is the charging end and the right-hand end is the tapping end. The furnace is tiltable about a pivot 3 to discharge its contents, the tapping end of the furnace being shown in tilted position in dotted lines in Figure 1. As the specific form of the furnace per se forms no part of the present invention, and as it is of standard type, the details thereof need not here be described.

The charging receptacle for the furnace is shown at 4, being disposed in charging position in Figure 1 and in filling position in Figure 2. Tracks 5 are provided upon which may be disposed a truck for receiving the charging receptacle and such receptacle may be set down on the truck by the overhead crane 6 and moved by any suitable source of power along the tracks 5 to a convenient filling position such as that shown in Figure 2. While thus disposed the charging receptacle 4 receives a complete charge of material for the furnace. It may then be moved along the tracks 5 toward the right viewing Figure 2, picked up by the overhead crane 6 and placed in charging position as shown in Figure 1. This may be done while the furnace is in operation. Immediately after the furnace has been tapped the charge may be dumped into the furnace from the charging receptacle, whereupon the furnace may again be put immediately into operation.

The fuel employed for heating the charge in the furnace is preferably coal. The coal is brought in on railroad tracks 7 and dumped into a hopper 8, whence it passes up a conveyer 9 into a pulverizer 10 where the coal is reduced to pulverized form. The pulverized coal, together with primary air, passes through the conduit 11 to the burner 12. A fan 13 blows primary air through a conduit 14 to the pulverizer 10 and blows secondary air through a conduit 15 to the burner 12. The burner 12 has a swivel mounting 16 so that it may readily be swung into and out of operative position relatively to the rotary furnace 2. Flame and products of combustion pass through the rotary furnace 2 from left to right viewing the drawings while the furnace is rotating about its horizontal axis and pass thence through a movable stack connection 17 and a fixed stack flue 18 and up and out through a stack 19. The stack 19 has a hollow wall 20 and air from the outside is drawn into the hollow wall 20 beneath the hood 21 and passes downwardly through the hollow wall in the stack and into the manifold 22 and thence through the conduit 23 to the fan 13. Thus the fan 13 supplies both primary and secondary air for combustion which is preheated in the hollow stack wall.

I find it highly advantageous to employ powdered coal as fuel because with fuel of this type it is possible at the temperatures employed to maintain more satisfactory reducing conditions than with any other fuel. Ordinarily there is a reduction of $Fe_2O_3$ in the rotary furnace as the solidified slag normally employed as the furnace charge ordinarily contains about 12 to 14% $Fe_2O_3$ whereas the $Fe_2O_3$ content of the melted slag as tapped from the rotary furnace is ordinarily in the range of 10 to 12% and usually not higher than about 11%. This reduction in the proportion of $Fe_2O_3$ in the slag is made possible by using powdered coal and maintaining a controlled reducing atmosphere in the furnace.

A pit 24 is provided in which are tracks 25 on which is a truck 26 adapted to receive a molten slag ladle 27. The movable stack connection 17 is also mounted on tracks 28 so that when it is time to tap the furnace it can be moved out of the way along such tracks.

As above stated, while the furnace is operating the charging receptacle 4 is removed from its elevated position as shown in Figure 1 to a filling position such as the position at which it is shown in Figure 2, where a full charge for the furnace is placed in it. It is then placed in charging position as shown in Figure 1 while the furnace continues in operation. The charging receptacle has an extensible chute 29 which may be retracted out of the way to permit tilting of the furnace about the pivot 3. After the filled charging receptacle 4 has been set in place as shown in Figure 1 and the previous charge has been melted the flow of air and fuel to the burner 12 is shut off, the burner is swung back to inoperative position about its swivel mounting 16 and the furnace while still rotating is tilted to tapping position as shown in dotted lines in Figure 1. At such a time a molten slag ladle 27 is positioned to receive the molten slag tapped from the furnace, after which the truck 26 may be moved along the tracks 25, and the slag ladle picked up by the overhead crane 6 and transported to the processing department. Preferably while the furnace is still tilted the elongated mass of recovered iron, if any, is removed therefrom and returned to the department at which the molten ferrous material is prepared, where it is reused. As soon as this has been done the furnace 2 is returned only part way to horizontal position from tapping position and while in such intermediate inclined position, it is charged by dumping the contents of the charging receptacle 4 into the left-hand end of the furnace. This is done by extending the chute 29 so as to direct the charge in the charging receptacle 4 into the furnace and opening the chute gate whereupon the charge falls by gravity from the charging receptacle through the chute into the furnace. The furnace continues its rotation during the charging and its angle of inclination during the charging is such as to result in gradual movement of the charge along the furnace so that when the charge has been dumped into the furnace it may immediately be returned to horizontal position for melting. As soon as the furnace is returned to horizontal position the burner 12 is swung into operative position and the supply of air and fuel thereto is renewed and the burner set in operation. Likewise the movable stack connection 17 is returned to the position shown in the drawings. While the furnace is in operation the charging receptacle 4 is removed from the position shown in Figure 1 to the filling position, where it is again filled and the cycle of operations just described is repeated indefinitely during operation of the plant.

As above mentioned, the charge to the furnace is normally recovered solidified slag, although on occasion slag making ingredients may be employed or a mixture of recovered solidified slag and slag making ingredients may be employed.

I find it desirable to cool the exterior of the rotary furnace when in operation and to this end I provide a spray pipe 30 atop the furnace through which water is sprayed onto the furnace shell, the water passing down around the shell into a pit (not shown). I find that such water spray prevents the furnace from overheating and assists in maintaining on the interior of the furnace a lining of semi-plastic non-molten slag which serves to minimize contamination of the slag being melted by the furnace lining or scorification of the lining by the slag. I find it preferable for reasons of efficiency and economy of operation to employ magnesite brick for lining the rotary furnace. While various other refractories may be employed the magnesite brick is the most resistant to scorification under the conditions obtaining in the melting of the type of slag here concerned with. If, however, the slag becomes contaminated with magnesia from the brick such contamination has very undesirable results in the processing step. Magnesia tends to make the slag relatively viscous and to change its characteristics so that it is less weldable. Consequently it is important to prevent contamination of the slag with magnesia from the furnace lining and this is accomplished by the provision of the water spray for cooling the furnace shell as above mentioned.

By employing the process of preparing molten slag above described I have found it possible to produce a molten iron silicate slag for use in the manufacture of wrought iron by the Aston process which has, as melted, a lower $Fe_2O_3$ content than has been obtainable heretofore. By employing such process I produce a molten iron silicate slag having as melted less than 12% $Fe_2O_3$ and preferably between 10 and 12% $Fe_2O_3$. In a further preferred range the $Fe_2O_3$ content may be between 10 and 11%. I set forth below broad and preferred ranges of the ingredients of a molten iron silicate slag which may be thus produced:

| Ingredient | Broad range | Preferred range |
| --- | --- | --- |
|  | Percent | Percent |
| FeO | 62 to 84 | 70 to 74 |
| $SiO_2$ | 5 to 16 | 10 to 12 |
| $Fe_2O_3$ | 10 to 12 | 10 to 12 |
| Other ingredients | 0 to 10 | 5 to 7 |

The "other ingredients" may be such ingredients as, for example, MnO, $Al_2O_3$, MgO, CaO, $P_2O_5$, etc.

For example a preferred analysis of slag as melted is as follows:

|  | Per cent |
| --- | --- |
| FeO | 70 to 74 |
| $SiO_2$ | 10 to 12 |
| MnO | 1.4 to 1.5 |
| $Al_2O_3$ | 2.25 to 2.5 |
| $Fe_2O_3$ | 10 to 12 |
| MgO | .9 to 1 |
| $P_2O_5$ | .6 to .7 |

While I have shown and described a present preferred embodiment of the invention and a present preferred method of practicing the same, it is to be distinctly understood that the invention is not so limited but may be otherwise variously embodied and practiced within the scope of the following claims.

I claim:

1. In the manufacture of wrought iron by the Aston process, the steps comprising preparing molten slag by applying heat to a charge of material which when melted will produce molten slag of the type employed in the Aston process and during such application of heat substantially continuously agitating the charge and admixing the thus melted slag with molten ferrous material to form balls of wrought iron.

2. In the manufacture of wrought iron by the Aston process, the steps comprising charging into a rotary furnace material which when melted will produce molten slag of the type employed in the Aston process, simultaneously applying heat to said material and rotating said furnace to produce molten slag, removing molten slag from the furnace and admixing the thus melted slag with molten ferrous material to form balls of wrought iron.

3. In the manufacture of wrought iron by the Aston process, the steps comprising charging into a rotary furnace material which when melted will produce molten slag of the type employed in the Aston process and which material also contains inclusions of iron, simultaneously applying heat to said material to bring the same to a temperature intermediate the melting point of said slag and the melting point of iron and rotating said furnace to produce molten slag and a mass of non-molten iron, separating the thus melted slag and the mass of non-molten iron and admixing the molten slag with molten ferrous material to form balls of wrought iron.

4. A metallurgical process comprising charging into a rotary furnace material which when melted will produce molten slag and which material also contains inclusions of metal, simultaneously applying heat to said material to bring the same to a temperature intermediate the melting point of said slag and the melting point of said metal and rotating said furnace to produce molten slag and a mass of non-molten metal and separating the thus melted slag and the mass of non-molten metal by discharging the melted slag from the furnace while leaving the mass of non-molten metal therein.

5. A metallurgical process comprising charging into a rotary furnace material which when melted will produce molten slag and which material also contains inclusions of iron, simultaneously applying heat to said material to bring the same to a temperature intermediate the melting point of said slag and the melting point of iron and rotating said furnace to produce molten slag and a mass of non-molten iron and separating the thus melted slag and the mass of non-molten iron by discharging the melted slag from the furnace while leaving the mass of non-molten iron therein.

6. A method of preparing molten slag for use in the manufacture of wrought iron by the Aston process comprising in a heating chamber applying heat substantially uniformly throughout a charge of material which when melted will produce molten slag of the type employed in the Aston process so that the greater portion of the charge is brought almost to the melting point before much thereof has become molten and in the same heating chamber continuing the application of heat to melt the charge, so that the thus melted slag will contain less than 12% of $Fe_2O_3$.

7. A method of preparing molten slag for use in the manufacture of wrought iron by the Aston process comprising charging into a rotary furnace material which when melted will produce molten slag of the type employed in the Aston process, simultaneously applying heat to said material, and rotating said furnace so as to bring the greater portion of the charge almost to the melting point before much thereof has become molten and continuing the application of heat and rotation of the furnace to melt the charge, thereby controlling oxidation so that the thus melted slag will contain less than 12% $Fe_2O_3$.

8. A process of recovering iron from the solidified by-product of the Aston process of making wrought iron such as occurs as scull in the slag receptacles or is squeezed out of the ball or bloom in the press or blooming mill comprising heating such by-product to a temperature materially lower than the melting point of iron but above the melting point of the greater portion of such by-product so as to melt such greater portion thereof and separating the iron from the molten material.

9. A method of preparing molten slag for use in the manufacture of wrought iron by the Aston process comprising charging into a hearth furnace material which when melted will produce molten slag of the type employed in the Aston process and melting such material by subjecting the same in said furnace to a temperature not substantially greater than about 2500° F.

10. In the manufacture of wrought iron by the Aston process, the steps comprising charging into a refractory lined rotary furnace material which when melted will produce molten slag of the type employed in the Aston process, simultaneously applying heat to said material, rotating said furnace and exteriorly cooling the furnace to avoid contamination of the charge by the refractory furnace lining, and admixing the thus melted slag with molten ferrous material to form balls of wrought iron.

11. A method of preparing molten slag for use in the manufacture of wrought iron by the Aston process comprising in a heating chamber applying heat from a powdered coal flame substantially uniformly throughout a charge of material which when melted will produce molten slag of the type employed in the Aston process so that the greater portion of the charge is brought almost to the melting point before much thereof has become molten and in the same heating chamber continuing such application of heat to melt the charge, so that the thus melted slag will contain less than 12% of $Fe_2O_3$.

EDWARD B. STORY.